G. AMBORN.
CHAIN PIPE VISE.
APPLICATION FILED AUG. 12, 1913.
1,103,896.
Patented July 14, 1914.
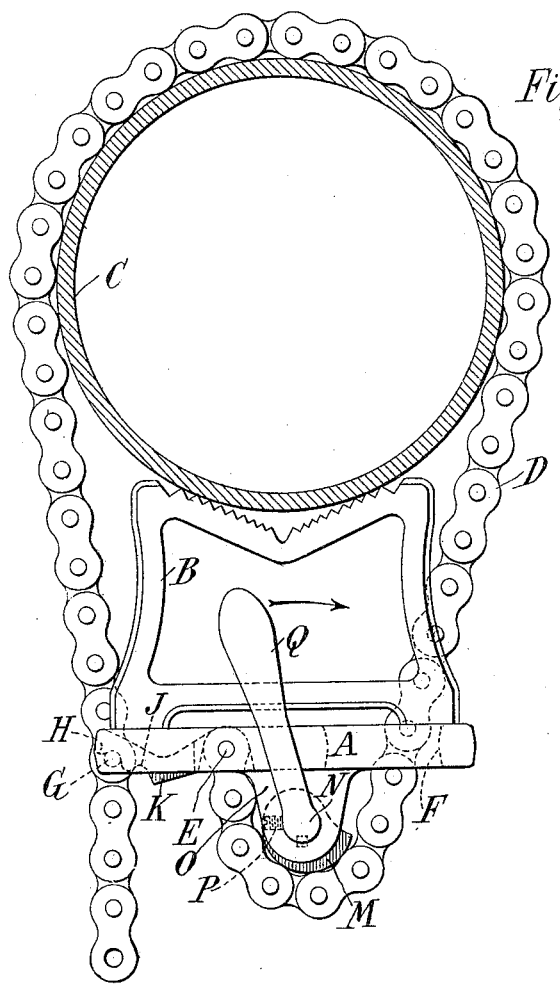
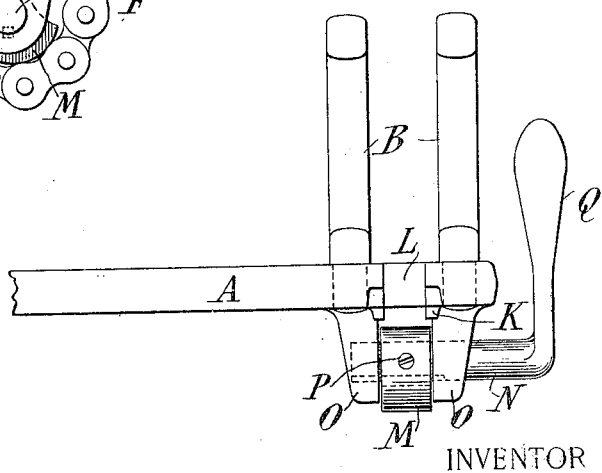
WITNESSES:
René Buine
Fred White
INVENTOR
George Amborn,
By Attorneys,
Fraser, Turk & Myers

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

CHAIN PIPE-VISE.

1,103,896. Specification of Letters Patent. Patented July 14, 1914.

Application filed August 12, 1913. Serial No. 784,399.

*To all whom it may concern:*

Be it known that I, GEORGE AMBORN, a citizen of the United States, residing at Chapinville, in the county of Litchfield and State of Connecticut, have invented certain new and useful Improvements in Chain Pipe-Vises, of which the following is a specification.

This invention aims to provide certain improvements in chain pipe vises whereby the chain may be quickly and easily applied and tightened upon the pipe, and to provide a construction which shall be simple and durable.

The accompanying drawings illustrate an embodiment of the invention.

Figure 1 is an end elevation of a vise with the chain applied thereon; Fig. 2 is a side elevation of the jaws of the vise with the chain and pipe removed.

Referring to the embodiment of the invention illustrated, the base A is mounted on a table or bench in any usual or suitable way, and carries at one end a pair of jaws B the upper edges of which are toothed and recessed to receive the pipe C. The chain D has one end fixed to the base by means of a pin E, and passes thence downward about a tightening device and thence upward through an opening F in the base. The other end of the chain is thrown over the pipe C and caught by one of its pintles G in one or another of the two notches H and J formed in projections K upon the inner faces of an open-ended slot L (Fig. 2) at the side of the base. By this means the chain is fitted as closely to the pipe as the spaces between the pintles and the location of the notches H and J will permit.

Additional means are provided for tightening the chain around the pipe after its free end has been locked in the manner above described. This tightening means engages the bight of the chain, so that its movement is effective to approximately twice the extent to which it would be effective if applied to an end of the chain. The tightening means is located below the base of the vise, where it does not interfere with the use of the same, and is well protected from accidental injury. This tightening device may be applied to a variety of chain vises, and may be constructed in various ways.

In the example illustrated it consists of a rotary cam M keyed on a spindle N which is journaled in jaws O projecting downward from the under side of the base A, the cam being fastened against lateral movement by means of a set-screw P so as to prevent escape of the spindle from the bearings. The spindle N extends beyond the end of the base and is provided with a handle Q adapted to be swung upward in the direction of the arrow, Fig. 1, below the pipe. After the loose end of the chain is fastened, the handle Q is swung in the direction of the arrow, and the cam M takes up any slack in the chain and forcibly tightens the same. The increase in the radius of the cam is so slow that it retains any position to which it is set. At the same time the throw of the cam is sufficient to take up the greatest possible slack in the chain by a single quick movement of the handle.

The hole F in the base retains a portion of the chain always about the cam, the end of the chain when not in use hanging free. When a pipe is inserted no fitting of the chain to the cam is necessary. It is only necessary to throw the free portion of the chain hanging outside of the opening F over the pipe and fasten it on the other side.

I claim as my invention:—

1. A chain pipe vise having a chain adapted to be passed around the pipe and fastened at two points, and means engaging the bight of the chain and adjustable relatively to the points at which the chain is fastened so as to tighten the chain on the pipe.

2. A chain pipe vise having a chain adapted to be passed around the pipe and fastened at two points, and a cam engaging the bight of the chain and adjustable relatively to the points at which the chain is fastened so as to tighten the chain on the pipe.

3. A chain pipe vise having a chain adapted to be fastened around the pipe and a cam engaging the bight of the chain and lying within the loop thereof which passes around the pipe and adjustable to force the engaged portion of the chain outward to tighten the chain on the pipe.

4. A chain pipe vise having a base and a chain fixed at one end and adapted to pass thence below and around the pipe and to be fastened in such position, and means engaging the bight of the chain below the base for tightening the chain on the pipe.

5. A chain pipe vise having a base and a chain fastened at one end and adapted to pass thence below and around the pipe and to be fastened in such position, a cam below the base engaging the bight of the chain for tightening the same on the pipe, and an operating handle for said cam extending upward above the base.

6. A chain pipe vise having a base and a chain fastened at one end and adapted to pass thence below and around the pipe and to be fastened in such position, and a rotary cam M journaled below the base and engaging the bight of the chain for tightening the same on the pipe.

7. A chain pipe vise having a base, a tightening device below the base, and a chain having one end attached to the base at one side of said device, said chain passing about the tightening device and thence upward and having a free end adapted to pass over the pipe and to be locked to the base on the same side on which the fixed end is attached to the base.

8. A chain pipe vise having a base with a hole F therethrough, a tightening device below the base, and a chain having one end fixed and passing from said fixed point into engagement with said tightening device and thence upward through said hole F and adapted to be fastened around the pipe.

In witness whereof, I have hereunto signed my name in the presence of two subscribing witnesses.

GEORGE AMBORN.

Witnesses:
CHARLES B. HARRIS,
WILLIAM HILDEBRAND.

---

Copies of this patent may be obtained for five cents each, by addressing the "Commissioner of Patents, Washington, D. C."